United States Patent Office 3,167,248
Patented Jan. 26, 1965

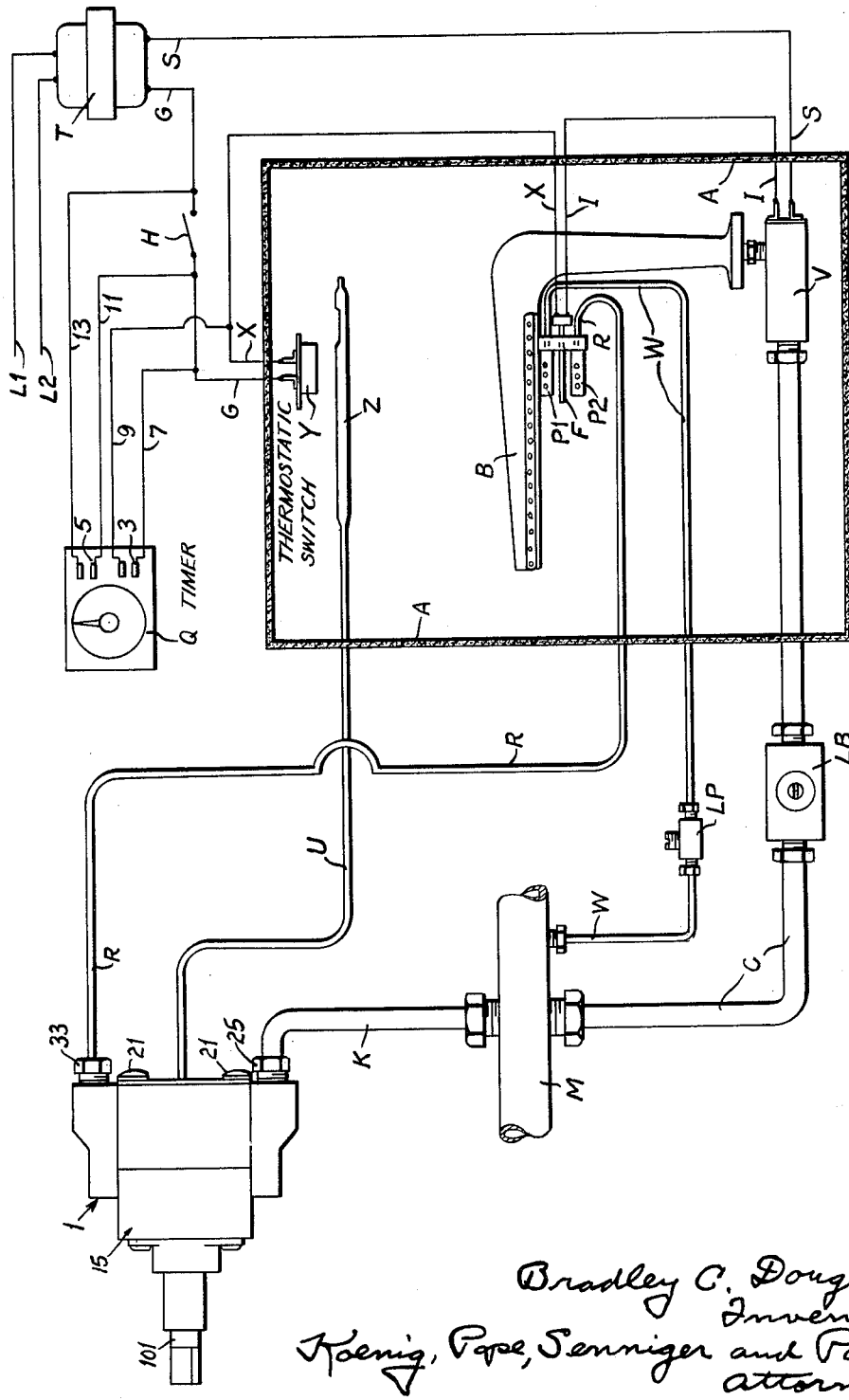

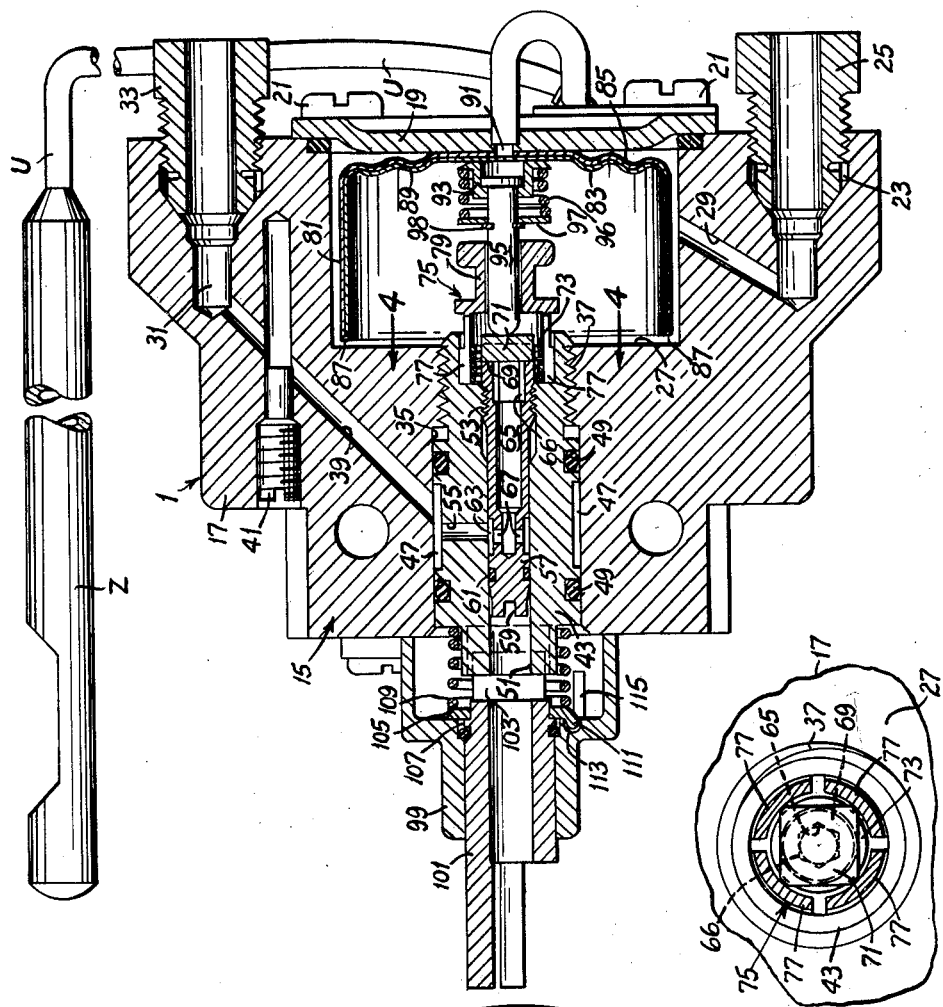
FIG. 3.
FIG. 4.
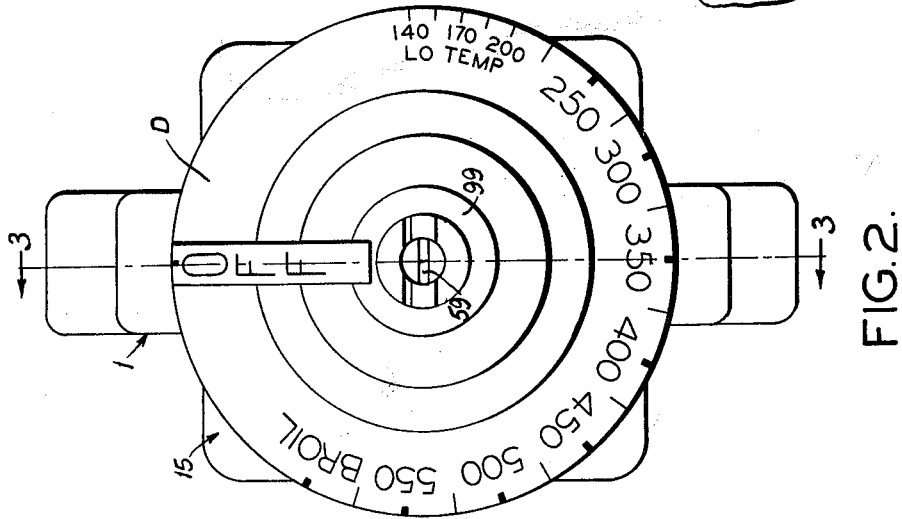
FIG. 2.

3,167,248
AUTOMATIC CONTROL OF GAS FOR HIGH AND LOW TEMPERATURE IN SEQUENCE
Bradley C. Douglas, Kirkwood, Mo., assignor, by mesne assignments, to Micro Controls, Inc., St. Louis, Mo., a corporation of Missouri
Filed Aug. 16, 1962, Ser. No. 217,375
14 Claims. (Cl. 236—15)

This invention relates to a gas regulating system and to apparatus constituting such a system, and with regard to certain more specific features, to a regulating system for cooking ranges and the like. The invention is an improvement upon structures of the general class shown in my U.S. patent application Serial No. 177,512, filed March 5, 1962, for Gas Regulating Apparatus, matured as Patent No. 3,123,299.

Among the several objects of the invention may be noted the provision of a gas regulating system and apparatus which will program a gas heating cycle wherein accurate regulation is obtained throughout both low- and high-temperature ranges according to various desired sequences, wherein the low range is useful, for example, for food warming, defrosting and the like; the provision of apparatus of the class described wherein a wide variety of sequences may be obtained in the succession of low- and high-range control; the provision of apparatus of the class described adapted to provide sequences in which action in a low-temperature range may occur before action in a high-temperature range, or vice versa, and one in which actions in a low-temperature range may precede and succeed action in a high-temperature range; and the provision of such apparatus which accomplishes regulation over high- and low-temperature ranges by means of comparative low-cost parts and in an economical manner. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a view diagrammatically illustrating the invention;

FIG. 2 is a front view in elevation of a thermostatic control valve embodied in the apparatus of FIG. 1;

FIG. 3 is an axial section of the valve shown in FIG. 2, the section being taken on line 3—3 of FIG. 2, some parts being omitted for clarity; and FIG. 4 is an enlarged fragmentary section taken on line 4—4 of FIG. 3.

Corresponding reference characters indicate corresponding parts throughout the several views of the drawings.

Although the invention described herein has general use, a particular use is for thermostatic gas valve systems for oven temperature control, in relation to which an oven will be described as an example.

The gas regulating apparatus is shown generally in FIG. 1. In this figure, the oven chamber of a gas range is generally indicated at A. P1 is a constantly burning pilot burner adapted to receive a small amount of gas from a main gas supply line M over a low-flow line W. An adjustable low-flow limit valve LP in line W controls the amount of gas passing to pilot burner P1. Pilot burner P1 serves to ignite an oven burner B when gas is supplied to the latter in a manner hereinafter described.

A normally extinguished pilot burner P2 is connected to a thermostatic gas valve 1 by a line R. The thermostatic gas valve 1 and main gas supply line M are connected together by a line K. As will be made apparent, the flow of gas to pilot burner P2 is controlled by the operation of the valve 1, which in turn is under the control of a manually operated dial D (FIG. 2) and a fluid-filled temperature-responsive bulb Z. Dial D is provided with markings from 140° F. to BROIL, the latter being approximately 600° F. (FIG. 2). Bulb Z is located in the space to be heated as, that is, the oven A which is heated by burner B.

Gas is supplied to burner B from line M through a line C and an electrically operated main burner valve V which opens when electrically excited. An adjustable main-flow limit valve LB controls the maximum amount of gas that may pass through line C to burner B.

The control apparatus includes an electrical circuit comprising a pair of power lines L1 and L2 connected between an electrical power source and a transformer T, the latter being connected to one terminal of valve V by a line S. The other terminal of valve V is connected to one terminal of a flame switch F by a line I. The other terminal of flame switch F is connected to one terminal of a thermostatic switch Y by a line X. Closing of the flame switch F is effected by heating from the flame of a pilot burner P2. Switch Y, which is located in the space heated by main burner B and therefore is in heat-exchange relationship with the latter, is adapted to be closed when the temperature of a flame emitted by the main burner is below 140° F., for example. Above such a temperature, the switch Y will be open.

Switch Y is connected to transformer T by a line G having a manually operable switch H therein. A timing device Q includes two switches 3 and 5. Switch 3 is shunted across switch Y by lines 7 and 9. Switch 5 is shunted across switch H by lines 11 and 13.

Gas issuing from pilot P2 will be ignited by the flame issuing from the constantly burning pilot P1. Flame switch F is so located that it will be heated to its predetermined operating temperature only by a flame issuing from pilot burner P2, and not by the flame issuing from pilot burner P1. Thus the electrically operated valve V will be energized, i.e., opened, when the flame switch F is closed, and the remaining circuit to the transformer is closed through one of the following switch paths: Y and 5; Y and H; 3 and 5; 3 and H. Timer Q controls the opening and closing of the switches 3 and 5. Further details concerning the timer Q are not necessary to this description inasmuch as a variety of timers are commercially available which by suitable indicated settings will set cams to operate numbers of switches in any order for various times. The operation of the switches Y, 3, 5, and H will be made apparent hereinafter.

Referring now to FIGS. 2 and 3, valve 1 comprises a body 15 formed of parts 17 and 19 held together by screws 21. At numeral 23 is shown a gas inlet into which an inlet fitting 25 is threaded. Inlet fitting 25 connects inlet 23 with the main gas line M through the pipe K (FIG. 1). Parts 17 and 19 form a gas chamber 27 which is connected to inlet 23 by an inlet passage 29. An outlet port 31 is connected by a fitting 33 to line R (FIG. 1).

Body 15 is provided with a passage 35 extending through the body to the gas chamber 27. The inner end of this passage 35 is threaded as indicated at 37. Passage 35 is in communication with outlet port 31 by means of a port 39. An adjustable threaded control valve 41 is adapted to control the maximum amount of gas that may pass through port 39. Threaded within passage 35 is a rotatable tubular member 43. Tubular member 43 is provided with an annular groove 47 on both sides of which are located sealing rings 49 which seal member 43 within passage 35. Member 43 is provided with a central passage 51 which is threaded as indicated at 53. A port 55 connects passage 51 with annular groove 47.

Threaded into passage 51 is a rotatable stem 57 which has a screwdriver control slot 59 on its outer end for adjustment purposes. A resilient sealing ring 61 toward the outer end of stem 57 seals the stem within passage 51. An annular groove 63 is provided in stem 57 between its inner and outer ends and is aligned with port 55.

Stem 57 is provided with a central cavity 65 opening at the inner end thereof into gas chamber 27. Openings 67 connect cavity 65 with annular groove 63. The inner end of stem 57 is provided with a seat 69 around a hexagonal enlargement 66 of cavity 65 to receive an Allenhead wrench for initially adjusting the position of seat 69 relative to tubular member 43. Thus the location of seat 69 can be adjusted with a wrench from the inner end of the stem 57 or with a screwdriver from the outer end of the stem.

A more or less square valve member 71 is adapted to seat on seat 69 and is biased therefrom by a spring 73. The operating engagement between valve member 71 and spring 73 will be clear from FIG. 4. Surrounding the valve member 71 and spring 73 is a cage member 75 slotted to provide passages and spring fingers 77 (FIG. 4), thereby also forming a press fit within the inner end of member 43. Valve member 71 is confined in cage member 75. Cage member 75 also includes a sleeve 79 extending into chamber 27. Gas may flow between the fingers 77.

A double-walled cup 81 is located in chamber 27. Cup 81 has an inside wall 83 and an outside wall 85, the latter being centrally soldered or otherwise attached to the inside of part 19. The marginal portions 87 of the walls 83 and 85 are sealed together as by welding or soldering, the remaining portions of the walls being unjoined. Both walls are corrugated in their portions forming the inside bottom 89 of cup 81. The outside wall 85 is provided with an opening 91 communicating with the line U. The other end of line U is connected to bulb Z which, as previously stated, is located in the space to be heated by the burner B. The bulb Z, line U and available space between the bimetallic members 83 and 85 are filled with a thermally responsive liquid which is adapted upon expansion in response to heating to enter between the members 83 and 85, so as to force them apart. This drives the bottom member 83 to the left as viewed in FIG. 3 away from bottom 85.

The inner bottom 83 carries an attached, cup-shaped member 93 which has a sliding engagement for overtravel on a flanged pin 95. Pin 95 and guide member 93 are held together as a unit by an expansible spring 96 located between guide member 93 and a washer 97 surrounding pin 95. Washer 97 is held in place on pin 95 by a retaining ring 98. When the dial D is in an OFF position and the oven is at room temperature pin 95 holds valve member 71 against seat 69. When the dial D is turned on, i.e., counterclockwise as viewed in FIG. 2, the member 43, stem 57 and consequently seat 69 are moved to the left as viewed in FIG. 3 and gas flows through valve 1 to outlet 31.

In response to increased oven temperatures applied to bulb Z, the fluid in the bulb and line V presses to the left the following parts: the inside cup bottom 83, parts 93, 96, 97, 98, 95 and valve member 71. This tends to seat valve 71 on seat 69. Under conditions in which the valve 71 may have closed and further expansion of the fluid occurs, member 93 will slide with overtravel on pin 95. Thus an overriding action occurs which prevents damage to any parts. Upon cooling, the reverse action occurs as the valve 71 moves toward its open position.

Mounted on the rear side of member 17, i.e., the left side as viewed in FIG. 3, is a cap member 99. An operating or control member 101 passes through cap 99 and is splined as indicated at 103 to member 43. A washer 105 is biased against an annular shoulder 107 on member 101 by an expansible spring 109. Thus the member 101 is biased to the left. Washer 105 has a finger 111 which engages in a notch 113 in cap 99 when the dial D and member 101 are in an OFF position. The dial is thus prevented from turning until the member 101 (on which the dial is located) is pushed inwardly to release the finger 111 from notch 113. A stop 115 located on the inside of cup 99 prevents the dial D and member 101 from counterclockwise rotation as viewed in FIG. 2 beyond the point marked BROIL.

Any of various types of electric control clocks or mechanisms can be utilized and can be set to open and close switches 3 and 5 at various times, depending on the desired sequence of heating cycles; or the operation of switches 3 and 5 may be manually effected. Thus, the heating cycles can be programmed or sequenced as desired. The following example illustrates one mode of operation of a typical heating program. It will be assumed that the thermostatic switch Y is calibrated to remain closed for temperatures below 140° F. and to open on temperatures above 140° F.; also that switch H is open as shown.

Consider a situation wherein a woman wishes to cook a roast for two hours at 500° F. and that she will be absent for five hours. Assume she is planning to leave the house at noon and wishes the roast to be done at 4:00 p.m. although she may not return to her house until later, say, 4:30 p.m. She therefore wishes the roast to be kept warm after it has been cooked until she can remove it from the oven.

First, she places the roast in the oven and sets the timing mechanism Q to cause the switches 3 and 5 initially to be open, to be closed at 2:00 p.m., and switch 5 maintained in a closed position and switch 3 opened at 4:00 p.m. The purpose of the opening and closing of these switches will become apparent as hereinafter explained. The dial D is turned counterclockwise to bring the 500° F. mark to the top of the dial. The woman may then leave the house at this time.

When the dial is turned to 500° F., the member 43 and consequently seat 69 are moved a predetermined amount to the left as viewed in FIG. 3. Spring 73 maintains valve member 71 against pin 95 so that gas passes from the chamber 27 through the cage member 75 into the hollow portion 65 of stem 57. The gas flows through port 67, groove 63, port 55, groove 47, port 39, outlet 31 and line R to the normally extinguished pilot burner P2 where it is ignited by constantly burning pilot P1. The flame switch F is heated to its predetermined operating temperature and closes. Switch Y is in a closed position as the oven temperature at this time is at room temperature, which is substantially below 140° F. However, since both switch 5 and switch 3 are open, a circuit through the electrically operated valve V is not completed and consequently valve V remains closed.

At 2:00 p.m., the switches 3 and 5 become closed. A circuit through the valve V is then completed and the valve is opened. Gas is then supplied to the main pilot B where it is ignited by the flame from pilot P1. It is to be noted that initially current will flow through both switch 3 and switch Y to complete the circuit through closed switch 5. However, as the temperature rises above 140° F., switch Y opens and the current flows only through switch 3. As the temperature reaches 500° F., the cup bottom wall 83 is pushed to the left as viewed in FIG. 3 and the parts 93, 96, 97, 98 and pin 95 cause the valve 71 to seat on seat 69 thereby stopping the flow of gas through the valve 1. This causes pilot P2 to be extinguished and flame switch F cools rapidly. Upon cooling to its predetermined operating temperature, flame switch F opens, thus interrupting the circuit through the main-flow valve V and causing the latter to close. As the oven begins to cool, the valve member 71 moves to the right as viewed in FIG. 3 and permits gas to flow through the valve 1 to pilot P2 which again becomes ignited and heats the flame switch F to its operating temperature, at which time the flame switch F closes and valve V is opened. This intermittent gas flow to burner B maintains the oven temperature at approximately 500° F.

At 4:00 p.m., switch 3 is opened, and switch 5 remains closed. Since the thermostatic switch Y is open (the temperature being above approximately 140° F.), the circuit through the main-flow valve V is interrupted and the valve closes. The temperature in the oven decreases towards 140° F. During this time, flame switch F is maintained closed since gas is supplied through valve 1 to pilot burner P2. This is because the dial D is set at 500° F. causing seat 69 to remain in its backed-off position, while the thermally responsive liquid in bulb Z, line U and between cup members 83, 85 contracts and permits spring 73 to force valve member 71 to the right as viewed in FIG. 3 off of seat 69. When the temperature decreases to approximately 140° F., thermostatic switch Y closes thereby closing a circuit through valve V and opening the latter to permit gas to flow to the main burner B. The temperature then increases slightly above 140° F. and switch Y opens, interrupting the circuit through valve V and causing the latter to close. The temperature is then maintained at approximately 140° F. under the control of thermostatic switch Y until the woman turns the dial to the OFF position.

It will be seen that the operation of the main burner is controlled by the flame switch F during high-temperature operation, and that the total length of the high-temperature period is controlled by switch 3, while switch Y controls the operation of the main burner during the low-temperature period.

The switch 5, being initially open, prevents the oven from attaining a temperature of approximately 140° F. immediately after the dial D is turned to the 500° F. mark since switch Y is initially closed and would close the circuit through valve V if switch 5 were closed. In this regard, it will be understood that the switch 5 and lines 11 and 13 could be eliminated and the switch H closed (or replaced by a length of wire) if it were desired to have the oven attain a temperature of approximately 140° F. immediately upon turning the dial D to its high temperature setting. The mode of operation after a period at 140° F. is then the same as described above, i.e., when it is desired to raise the temperature to approximately 500° F., switch 3 is closed. After a predetermined period at 500° F., switch 3 is opened and the oven temperature drops to approximately 140° F., where it is maintained under control of switch Y until the dial D is turned to an OFF position.

It is to be understood that various other cooking cycles could be programmed by setting the switches 3, 5 and H to open and close at various times.

Although two pilot burners are shown, i.e., a constantly burning pilot P1 and a normally extinguished pilot burner P2, it will be understood that a single pilot burner could be utilized in an equivalent manner. Such a pilot burner would have a constant low flame of insufficient intensity to heat flame switch F to its predetermined operating temperature but when supplied with an additional amount of gas through valve 1, would produce a flame of greater intensity than the normally low-intensity flame and cause flame switch F to be heated to its operating temperature. When this additional gas to the pilot burner is cut off, the pilot flame drops back to its normal low intensity and flame switch F cools to below its predetermined operating temperature. Whether the apparatus has a two-burner pilot system or a one-burner pilot system it will be readily visualized that there will be a constant low-intensity flame emitted from the pilot means (from P1 in the pilot system shown in the drawings and from an equivalent single pilot burner as described). Also, in either case a high intensity flame will be emitted from the pilot means when an extra amount of gas is supplied thereto through valve 1 (to P2 in the system shown or to the equivalent single pilot mentioned).

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A gas regulating system comprising means forming a chamber, means for controlling the heating of the chamber throughout low- and high-temperature ranges comprising constantly burning pilot burner means having a low intensity flame normally issuing therefrom, a main burner located in said chamber adapted to be ignited from said pilot burner means, a main-flow control valve controlling gas flow to the main burner, an electrical control circuit comprising a source of electrical energy, electrically operated means adapted to control the operation of said valve, a first thermostatically operated switch movable between first and second positions and adapted to move to the second position in response to the temperature produced by a pilot flame of a greater intensity than the temperature produced by the low-intensity pilot flame, a second thermostatic switch located in heat-exchange relationship with said main burner and movable between first and second positions, said second thermostatic switch being in its second position when the temperature within said chamber produced by a flame emitted from the main burner is in said low range, said second switch being movable to its first position when the temperature produced by a flame emitted from the main burner rises above a predetermined value toward said high-temperature range, and a third switch movable between first and second positions, said third switch normally being in its first position, said main-flow control valve being opened by said electrically operated means when said first switch is in its second position and at least one of the remaining switches is in its second position.

2. A gas regulating system as set forth in claim 1 wherein said circuit includes a fourth switch adapted for movement between first and second positions, said main-flow control valve being opened when said first and fourth switches are in their second position and one of the remaining switches is in its second position.

3. A gas regulating system as set forth in claim 1 including a valve body having an inlet adapted to be connected to a source of gas and an outlet connected to said pilot burner means, a thermostatically controlled valve member controlling gas flow from the inlet to the outlet, and adjustable control means for varying the temperature in said chamber at which the valve member will block the gas flow from the inlet to the outlet, said pilot burner means being adapted to produce a pilot flame of sufficient intensity to move said first switch to its second position upon receiving sufficient gas from said outlet.

4. A gas regulating system as set forth in claim 3 wherein said circuit includes a fourth switch adapted for movement between first and second positions, said main-flow control valve being opened when said first and fourth switches are in their second position and one of the remaining switches is in its second position.

5. A gas regulating system as set forth in claim 1 wherein said first switch comprises a flame switch located in heat-exchange relationship with said pilot burner means.

6. A gas regulating system as set forth in claim 5 including a fourth switch connected in series with said electrically operated means, flame switch and thermostatic switch, said main-flow control valve being opened when said flame switch and said fourth switch are closed and one of the remaining switches is closed.

7. A gas regulating system comprising means forming a chamber, means for controlling the heating of the chamber throughout low- and high-temperature ranges comprising constantly burning pilot burner means having a low-intensity flame normally issuing therefrom, a main burner located in said chamber adapted to be ignited from said pilot burner means, a main-flow control valve controlling gas flow to the main burner, an electrical control circuit comprising a source of electrical energy, electrically operated means adapted upon energization to open said valve and upon deenergization to close said valve, a first thermostatic switch adapted to close in response to the temperature produced by a pilot flame of a greater intensity than the temperature produced by the low-intensity pilot flame, a second thermostatic switch located in heat-exchange relationship with said main burner, said second thermostatic switch being closed when the temperature range, a third switch shunted across said second therfrom the main burner is in said low range, said second switch being adapted to be open when the temperature produced by a flame emitted from the main burner rises above a predetermined value toward said high-temperature range, a third switch shunted across said second thermostatic switch, a valve body having an inlet adapted to be connected to a source of gas and an outlet connected to the pilot burner means, a thermostatically controlled valve member controlling gas flow from the inlet to the outlet, and adjustable control means for varying the temperature in said chamber at which the valve member will block the gas flow from the inlet to the outlet, said pilot burner means being adapted to produce a pilot flame of sufficient intensity to move said first switch to its second position upon receiving sufficient gas from said outlet, said electrically operated means, first switch and second switch being connected together in series across said source of power, whereby said main-flow valve is opened when said first switch is closed and one of the remaining switches is closed.

8. A gas regulating system as set forth in claim 7 including a fourth switch connected in series with said valve, first switch and second switch, whereby said main-flow control valve is opened when said first and fourth switches are closed and one of the remaining switches is closed.

9. A gas regulating system as set forth in claim 7 wherein said first switch comprises a flame switch located in heat-exchange relationship with said pilot burner means.

10. A gas regulating system as set forth in claim 9 including a fourth switch connected in series with said valve, flame switch and second switch, whereby said main-flow control valve is opened when said flame switch and said fourth switch are closed and one of the remaining switches is closed.

11. A gas regulating system comprising means forming a chamber, means for controlling the heating of the chamber throughout low- and high-temperature ranges comprising a main burner located in said chamber, a main pilot burner adjacent thereto, gas supply means, a constantly burning auxiliary pilot burner connected to said gas supply means adapted to light said main pilot burner and said main burner, a main-flow control valve controlling gas flow to the main burner, an electrical control circuit comprising a source of electrical power, electrically-operated means adapted upon energization to open said valve, a first thermostatic switch adapted to be closed upon heating and located in heat-exchange relationship with said main pilot burner, a second thermostatic switch located in heat-exchange relationship with said main burner, said second switch adapted to be closed when the temperature within said chamber produced by a flame emitted from the main burner is in said low range, said second switch being opened when the temperature produced by a flame emitted from the main burner rises above a predetermined temperature toward said high-temperature range, and a third switch shunted across said second switch, a valve body having an inlet adapted to be connected to a source of gas and an outlet connected to the main pilot burner, a thermostatically controlled valve member controlling gas flow from the inlet to the outlet, and adjustable control means for varying the temperature in said chamber at which the valve member will block the gas flow from the inlet to the outlet, said main pilot burner being adapted to produce a pilot flame of sufficient intensity to move said first switch to its second position upon receiving sufficient gas from said outlet, said electrically-operated means, first switch and second switch being connected together in series across said source of power, whereby said main-flow control valve is opened when said first switch is closed and one of the remaining switches is closed.

12. A gas regulating system as set forth in claim 11 including a fourth switch connected in series with said valve, first switch and second switch, whereby said main-flow control valve is opened when said first and fourth switches are closed and one of the remaining switches is closed.

13. A gas regulating system as set forth in claim 11 wherein said first switch comprises a flame switch located in heat-exchange relationship with said pilot burner means.

14. A gas regulating system as set forth in claim 13 including a fourth switch connected in series with said valve, flame switch and second switch, whereby said main-flow control valve is opened when said flame switch and said fourth switch are closed and one of the remaining switches is closed.

References Cited in the file of this patent

UNITED STATES PATENTS

| | | |
|---|---|---|
| 1,831,077 | Newell | Nov. 10, 1931 |
| 1,842,335 | Te Pas | Jan. 19, 1932 |
| 2,012,067 | Mayo | Aug. 20, 1935 |
| 2,032,046 | Branch | Feb. 25, 1936 |
| 2,058,104 | Piers | Oct. 20, 1936 |
| 2,250,360 | Cram | July 22, 1941 |
| 2,509,896 | Walker | May 30, 1950 |
| 2,600,252 | Long | June 10, 1952 |

FOREIGN PATENTS

| | | |
|---|---|---|
| 803,132 | France | June 29, 1936 |
| 1,235,208 | France | May 23, 1960 |

UNITED STATES PATENT OFFICE
CERTIFICATE OF CORRECTION

Patent No. 3,167,248                      January 26, 1965

Bradley C. Douglas

It is hereby certified that error appears in the above numbered patent requiring correction and that the said Letters Patent should read as corrected below.

Column 7, line 11, for "range, a third switch shunted across said second ther-" read -- within said chamber produced by a flame emitted --.

Signed and sealed this 6th day of July 1965.

(SEAL)
Attest:

ERNEST W. SWIDER                      EDWARD J. BRENNER
Attesting Officer                       Commissioner of Patents